United States Patent [19]

Waelti

[11] Patent Number: 4,928,437
[45] Date of Patent: May 29, 1990

[54] MEANS AND METHOD FOR RESETTING A CYLINDRICAL GRINDING MACHINE

[75] Inventor: Werner Waelti, Selzach, Switzerland

[73] Assignee: Werkzeugmaschinenfabrik Tschudin, Grenchen, Switzerland

[21] Appl. No.: 102,019
[22] PCT Filed: Nov. 24, 1986
[86] PCT No.: PCT/CH86/00161
  § 371 Date: Sep. 2, 1987
  § 102(e) Date: Sep. 2, 1987
[87] PCT Pub. No.: WO87/03237
  PCT Pub. Date: Jun. 4, 1987

[30] Foreign Application Priority Data
Nov. 25, 1985 [CH] Switzerland ................... 5042/85

[51] Int. Cl.$^5$ ............................................. B24B 49/00
[52] U.S. Cl. ............................. 51/165.71; 51/165.77; 51/289 R; 51/105 SP
[58] Field of Search ............. 51/165.71, 165.8, 165 R, 51/165.76, 289 R, 290, 326, 327, 165.77, 105 SP

[56] References Cited

U.S. PATENT DOCUMENTS

| | | |
|---|---|---|
| 3,664,066 | 3/1972 | Clark . |
| 4,115,956 | 9/1978 | Huffman . |
| 4,584,795 | 4/1986 | Akabane ..................... 51/165.71 |

FOREIGN PATENT DOCUMENTS

| | | |
|---|---|---|
| 0131366 | 1/1985 | European Pat. Off. . |
| 1502422 | 3/1972 | Fed. Rep. of Germany . |
| 2044392 | 2/1971 | France . |
| 452384 | 5/1968 | Switzerland . |
| 639025 | 10/1983 | Switzerland . |
| 1367091 | 9/1974 | United Kingdom . |

OTHER PUBLICATIONS

Patent Abstracts of Japan, Band 7, Nr. 179, (M-234)(1324) 8-1983.

Primary Examiner—Frederick R. Schmidt
Assistant Examiner—M. Rachuba
Attorney, Agent, or Firm—Sherman and Shalloway

[57] ABSTRACT

To avoid manual rotation of the rotary table (3) on the turning slide (2) of an NC (numerical control) coordinate grinding machine having a grinding wheel (1), when a conical region is being ground on a workpiece next to a cylindrical region, an NC controllable rotating devices (14) for the rotary table (3) is mounted on the turning slide (2). A measurement device (18) is also provided, for determining the distance (R) from a reference surface of the conical region and the B axis. After grinding a calibration cylinder, the distance (S) between the grinding line (6) and the C axis is calculated, and the C axis in this rotational position around the B axis is reset ("zeroed") in the computer (9'). This provides sufficient parameters for calculating the grinding program for the workpiece which is to be ground. In this way it is possible to grind automatically and precisely a series of workpieces having simultaneously both cylindrical and conical regions, without the need for manual adjustments.

4 Claims, 1 Drawing Sheet

MEANS AND METHOD FOR RESETTING A CYLINDRICAL GRINDING MACHINE

The invention relates to a method according to the preamble of claim 1, and to means of carrying out the method, according to the preamble to claim 6.

Computerized numerical control (CNC) grinding machines are increasingly employed because they can be programmed economically and relatively simply, whereby changes to the machine for grinding disparate parts are much simpler and faster than changes required for ordinary cylindrical grinding machines. In addition, CNC machines enable maximum precision and repeatability, within a series and between series.

It is, however, difficult and time consuming to grind workpieces with both cylindrical and conical regions with a CNC machine. In particular, it is difficult to adjust the longitudinal axis of the piece to be ground (so-called C axis) parallel to the grinding line (which corresponds to the longitudinal axis of the turning slide) (so-called Z axis) for the grinding of cylindrical pieces.

This problem is partially solved by a device according to Swiss Pat. No. 623,261 of the present Applicant. Said device still does not enable determination of the precise position of the longitudinal axis of the turning slide. As a result, the position of the longitudinal axis of the workpiece cannot be determined for further processing by the computer.

With known CNC cylindrical grinding machines it is also impossibly complex to calculate how the aforementioned C axis is shifted rotationally relative the B axis, which runs normal to the grinding line and the turning slide, or how the grinding wheel or turning slide must be moved to grind a cone into the cylindrical part of the workpiece at a predetermined location. The computer is not given the necessary reference quantities, and there is a shortage of required measuring and position-adjusting devices.

The underlying problem of the present invention is to devise a method and means of resolving these difficulties. In addition, the invention should contribute additional simplification in operation of cylindrical grinding machines, particularly those of the CNC type, and should enable automatic grinding of combined cylindrical and conical workpieces.

This problem is solved according to the invention by a method according to claim 1 and by means according to claim 6.

The inventive method, and an advantageous embodiment of the inventive means, will be described with reference to the drawings. The inventive means are presented as modifications to a known CNC cylindrical grinding machine.

Figure 1:
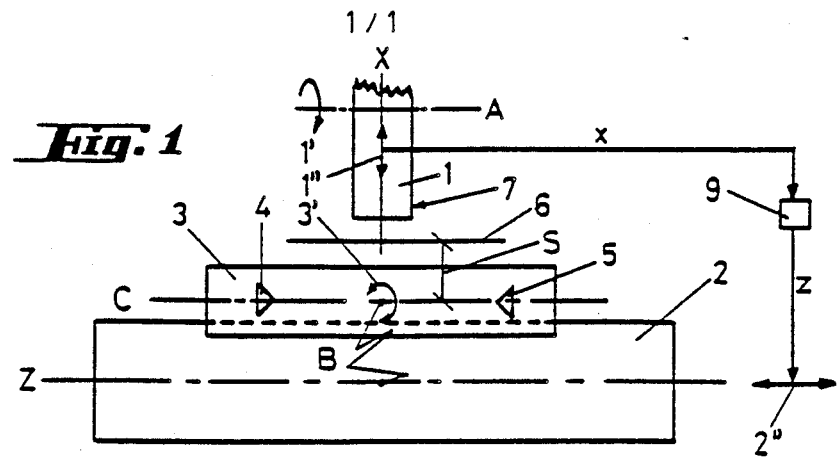
FIG. 1 is a schematic top view indicating the relevant parts and axes of an ordinary cylindrical grinding machine.

The three relevant parts of the machine (relevant as to the invention) are shown in FIG. 1. These are the grinding wheel 1, the turning slide 2, and the rotary table 3. The grinding wheel 1 is rotatable around an axis A, in the direction of rotation 1'. The axis A can be shifted linearly along axis X, in the direction of double arrow 1'', to move the grinding wheel toward or away from the turning slide 2 as required. The turning slide 2 can be translated along its longitudinal axis, the Z axis, in the direction of double arrow 2'. The rotary table 3 is borne on the turning slide 2, and bears a pair of turning centers (4, 5) between which the workpiece 10 (FIG. 2) is compressively held for grinding. The longitudinal axis of the rotary table, the C axis, is identical with the longitudinal axis of the workpiece 10 undergoing grinding, and passes through the turning centers (4, 5). When the cylindrical part 10' of workpiece 10 is being ground, the C axis is disposed parallel to and, advantageously, vertically over the Z axis. It is shown here as horizontally offset with respect to the Z axis merely to facilitate illustration of the individual parts and axes. This artificial offset is indicated by the zigzag line connecting the B axis as illustrated to its proper point intersecting the Z axis. The rotary table 3 is rotatably mounted so as to be capable of swinging in the direction of double arrow 3' around the B axis, which axis runs vertically with respect to the turning slide 2. A fictional grinding line 6 indicates the line along which the perimeter of the grinding wheel contacts the perimeter of the workpiece during the grinding.

One skilled in the art knows that for grinding a perfect cylinder 10' between the turning centers (4, 5) in so-called "plunge-cut grinding," wherewith neither the workpiece nor the grinding wheel 1 is moved parallel to its respective longitudinal axis (A, C, respectively) during actual grinding, the grinding line 6, and thus the periphery of the grinding wheel 1, must remain absolutely parallel to the C axis.

For cylindrical grinding of a workpiece which is longer than the grinding wheel 1 is wide, which is only possible if either the workpiece is moved back and forth along the Z axis by way of moving the turning slide (which is the usual technique) or the grinding wheel 1 is moved back and forth along its axis A, one of the following conditions must hold:

the two axes C and Z are absolutely parallel to each other and to the grinding line 6; or the A axis is absolutely parallel to the Z axis.

With known cylindrical grinding machines and in the normal situation when the workpiece is moved past the grinding wheel 1 by moving the turning slide 2 the C axis and Z axis can only be brought into a parallel relation by grinding a calibration cylinder, wherewith the rotary table 3 is swung manually around its axis B until the ground workpiece has become a true cylinder which can then be used for calibration, to correctly set the C axis and to determine the distance S of the grinding line 6 from said C axis. Only after such an adjustment of the grinding machine can prescribed cylinders be ground (including, e.g., workpieces 10 according to FIG. 2). For such a workpiece 10, in order to ensure that the C and Z axes and the grinding line 6 are parallel, one must also ensure that the periphery of the grinding wheel 1 is parallel to these. Otherwise, the cylindrical part 10' will not be cylindrical in its region adjoining the conical part 10'', but will be slightly conical (corresponding to the inclination of the said periphery with respect to the C axis). Obviously, the amplitude of the back and forth movement of the turning slide 2 depends on the length of the cylindrical part 10', the width of the grinding wheel 1, and the location of the reference surface 11 of the conical part with respect to the right edge 7 of the grinding wheel.

In order to be able to grind the conical part 10" following the grinding of the cylindrical part 10' of the workpiece 10, the grinding wheel 1 must be separated from the workpiece 10 (wheel 1 and its rotational axis A must be separated on the X axis from the C axis, and thus from workpiece 10), whereupon the rotary table 3 is swung through an angle around its rotational axis B which angle corresponds to the cone angle. The grinding wheel may then be reapplied to the workpiece 10, and the back and forth movement of the turning slide 2 may be resumed, until the conical part 10" has reached its intended dimensions. This result can only be achieved by measuring at regular intervals if the position of the reference surface 11 relative to the B axis is not determined.

Figure 2:
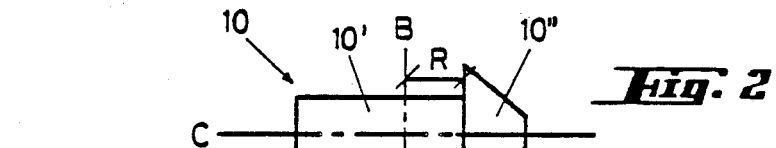
FIG. 2 is a workpiece which is to be ground on said machine, which workpiece has a cylindrical and a conical part.

One skilled in the art knows from experience that grinding of workpieces having the shape of that of FIG. 2, or similar shapes, in a clamping (or chuck) arrangement, is very costly and time consuming on modern CNC cylindrical grinding machines, and can be accomplished only with difficulty in series production, because too few parameters are defined for calculating a machine program. In addition, ordinary cylindrical grinding machines only offer CNC controlled moments relative to the X and Z axes (as represented in FIG. 1 by the double arrows x and z, and the computer 9 (FIG. 3).

This situation is changed if, according to the invention, the grinding method is modified at least to the extent that after the correct adjustment of the C axis by means of the calibrating cylinder (as mentioned supra) the rotational position of the C axis around the B axis is electronically reset for the computer of the CNC cylindrical grinding machine; i.e., if the rotational position of the rotary table 3 around the B axis, which position is required to produce a perfect cylinder on workpiece 10 is set as the "null" angle in the radial coordinate system centered at the B axis. In addition the relative position of the reference surface 11 of the conical part must be defined, with respect to the fixed turning center 4 and the rotational axis B (distance R to the B axis). This measurement can be arrived at advantageously by monitoring the edge 7 of grinding wheel as it approaches the reference surface 11, at the commencement of the grinding process for the cylindrical part 10', said monitoring being by a solid-conducted sonar device, wherewith at the instant when said edge 7 contacts said surface 11, the Z-position of the turning slide 2 is fixed, then the desired value of R can be calculated based on the known width of the wheel 1, the X axis of which wheel is normal to the B axis. It is necessary to know the value of R in order to control the displacement of the grinding wheel 1 along the X axis following the CNC controlled swinging of the rotary table 3; i.e., to obtain the desired setting for grinding the cone. Due to the resetting of the C axis and the determination of the distance R from the B axis to the reference surface 11, the control computer of the machine now has all the required data (in combination with all other customarily determined quantities) to calculate a machining program whereby it is possible to automatically grind a whole series of similar workpieces. For such series grinding, the resetting of the C axis and the determination of the distance R can be carried out anew for each workpiece, or else a calibration workpiece can be employed to enable these operations to be performed only once for the entire series as long as the calibration technique proves to be sufficiently precise and uniform. Another possibility is to specifically determine only one of the two quantities: null value of C axis and R) for each workpiece, with the other being assumed uniform for the series.

Obviously, this fabrication technique requires that additional means be provided to the CNC cylindrical grinding machine. These means essentially comprise, according to the invention, a "resetting" (or "null-setting") device for the C axis, and a CNC controlled swinging device for the rotary table 3.

Figure 3:
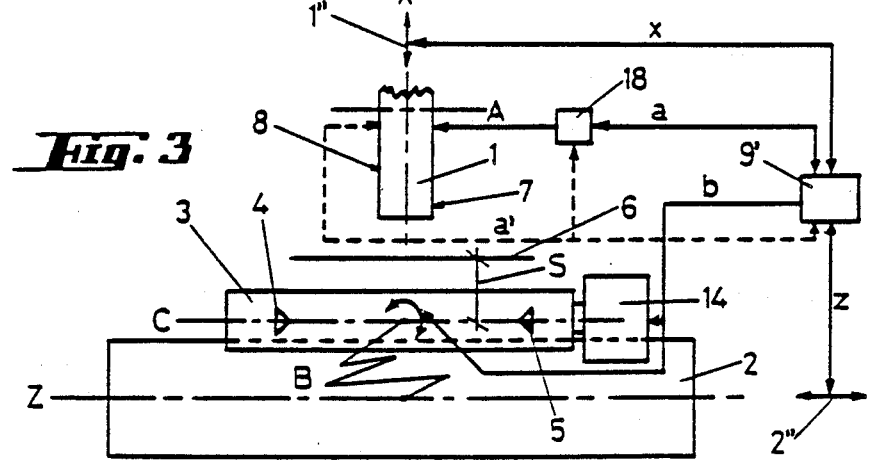
FIG. 3 is a schematic top view indicating the relevant parts and axes of a cylindrical grinding machine which is provided with the inventive means and is capable of grinding the workpiece of problems.
Figure 4:
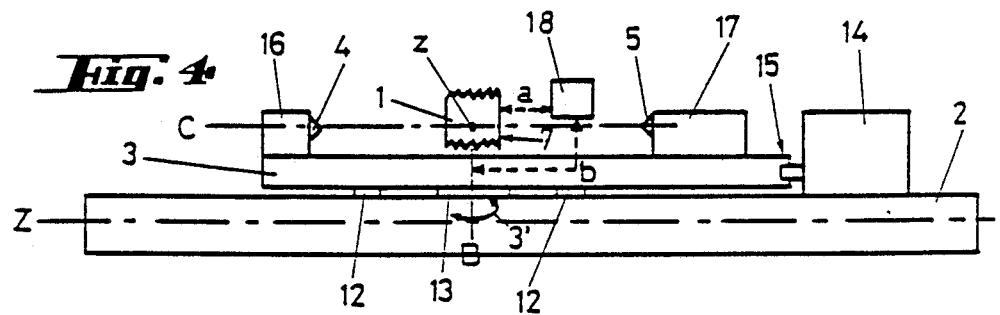
FIG. 4 is a schematic side view of an advantageous embodiment of the inventive means, with various structural details omitted.

FIG. 3 is a schematic depiction of an appropriately equipped CNC cylindrical grinding machine. A grinding wheel 1 is translatable along the X axis and possibly the A axis as well. A turning slide 2 is movable back and forth on the Z axis. A rotary table 3, mounted on turning slide 2, has a fixed turning center 4 and a tail center 5. The longitudinal axis C of the workpiece passes through the turning centers (4, 5). The configuration as described thus far matches that of an ordinary machine (FIG. 1). The machine of FIG. 3 is distinguished in that the rotary table 3 can be rotationally displaced around the B axis (in the direction of double arrow 3') by CNC means including a rotation device 14, whereby each rotational position is instantaneously measurable and fixable, as indicated by the double arrow b (FIG. 4). In addition, advantageously at least the right edge 7 of the grinding wheel is monitored as to its distance to the B axis, by means of a measuring device 18 and the associated computer 9', as indicated by double arrow a. This enables determination of the distance R between the reference surface 11 of the cone and the B axis. There may also be cause to similarly take into account the second edge 8 of the grinding wheel; this is indicated by the dashed line a'.

One skilled in the art knows that the above modifications necessitate that an ordinary CNC cylindrical grinding machine be provided with a computer 9' which can process more parameters than for an ordinary machine of this type, and that the mechanisms for swinging the rotary table 3 must be CNC-compatible. Further, a measuring device, preferably a solid-conducting sonar device, must be employed whereby the measured position of at least one edge of the grinding wheel relative to the B axis can be input to the computer 9' at an arbitrary time during the grinding process.

From a design and structural standpoint, these modifications can be embodied in various ways. A CNC controlled motor can be employed to drive a worm drive which acts on a toothed segment of the rotary table 3, with the rotational position of the table 3 being measured by an encoder or rotation sensor disposed on the motor or on the worm. Alternatively, the rotational position of the rotary table 3 can be measured with a glass measuring rod which is mounted on the turning slide 2 and measures the linear displacement of a measuring point on the rotary table 3. Alternatively, it is suitable to employ an encoder directly on the rotational axis of the rotary table 3. In order to attain the highest possible measurement precision, care must be taken that the rotary table is brought to the measuring point always in the same direction; one way to achieve this is to previously overshoot the measuring point (when such is required).

DC motors or stepping motors are suitable for driving the worm drive. If a stepping motor is employed directly on the axis of the rotary table, the worm drive may be dispensed with.

In a further improved CNC cylindrical grinding machine, it is possible to avoid grinding a calibration cylinder, by employing additional measuring devices for accurate determination of the cylindricity and diameter of the cylindrical part 10', and the distance from at least one of the edges (7, 8) of the grinding wheel to the B axis. Suitable measuring devices are solid-conducting sonar deVices, contactless end switches, laser beams, photocells, diameter measuring devices, longitudinal positioning apparatuses, etc.

In order for the CNC rotary table 3 to function satisfactorily, advantageously its positioning and clamping-/releasing mechanisms on the turning slide 2 must be CNC-compatible. FIG. 4 shows an advantageous embodiment with a control system which meets all requirements. Structural details which are obvious to one skilled in the art have been omitted in FIG. 4 in order to provide a quickly comprehensible representation.

The scale of FIG. 4 is slightly enlarged. The turning slide 2 is shown in a side view, with rotary table 3 rotatably mounted on top of said slide 2. The mounting of table 3 on slide 2 is preferably without play, via a ring bearing 12. In order to fixedly bind the table 3 to the slide 2 supporting it, during the machining of the workpiece 10, a CNC controlled hydraulic clamp device 13 is provided which operates between table 3 and slide 2. In order to be able to rotationally displace the rotary table 3 with minimum force, the clamp device 13 may be released, and the rotary table is advantageously supported on an air cushion. The rotary table 3 ( and the C axis) is then brought into the determined rotational position, with the aid of a CNC controlled rotation- and rotational angle measuring device 14 (which may be of a design such as described supra), and, e.g., by drive means 15. The workpiece, which is disposed between the turning centers (4, 5) is thereby swung with respect to the grinding line 6 so that a cone can be ground into it. As usual, the turning centers (4, 5) are parts of a tailstock 16 and a headstock 17, respectively, both of which are longitudinally slidably attached to the rotary table 3.

A measuring device 18, which may be a solid-conducting sonar device, as mentioned supra, is connected to the turning slide 2. It serves to determine the distance from the edge 7 of the grinding wheel to the B axis at the point in time of the grinding process when the said edge comes into contact with the reference surface 11 of the conical part. Thereby the distance R from the reference surface 11 to the B axis is determined. At a later time in the grinding process, this distance R will define the start of X-advance of the grinding wheel 1 for producing the prescribed conical shape 10''.

A qualified machined tool constructor does not require the structural details of the various components of the inventive means in order to carry out the inventive method. These are know to him from his practice, and require no inventiveness to employ them in the manner required by the present invention.

What is claimed is:

1. In a method of resetting a cylindrical grinding machine comprising: at least one grinding wheel (1), said at least one grinding wheel being rotatable about an axis A, said at least one grinding wheel being translatable along an axis X, said axis X being perpendicular to said axis A; a turning slide (2), said turning slide being translatable along an axis Z; a rotary table (3) rotatably disposed on said turning slide (2), said rotary table being rotatable around an axis B, said axis B being perpendicular to said axis Z, said rotary table (3) being designed and equipped to receive a workpiece (10) which is to be ground, said workpiece being held between two turning centers (4,5) defining an axis C; and a numerical control computer means (a) for effecting relative movement between said at least one grinding wheel, said turning slide and said rotary table; said method comprising: grinding a workpiece (10) along a grinding line (6), with rotation of said rotary table (3) about said axis B until said axis of said workpiece (10) is parallel to said axis Z of said turning slide (2) as determined by the production of a calibration cylinder having predetermined dimensional requirements; wherein the improvement comprises inputting the thus defined rotational position of the C axis with respect to the B axis into said numerical control computer means for resetting said axis C parallel to said axis Z; and, based on the position of the grinding wheel on said X-axis and the diameter of the calibration cylinder, calculating a distance (S) between the grinding line (6) and the axis C and inputting said distance (S) to the computer for resetting the final position of said grinding wheel on said axis X during grinding.

2. The method according to claim 1, wherein workpieces (10) having cylindrical (10') and conical (10'') parts are to be ground; said method further comprising calculating, based on the known thickness of the grinding wheel, a distance (R) from a reference surface (11) of the conical part to the axis B determined at the point in time of the grinding process when an edge (7) of the grinding wheel contacts said reference surface (11) of the conical part (10''), and inputting the value of (R) to the numerical control computer means for resetting the final position of said grinding wheel on said axis X during grinding of said conical part.

3. The method according to claim 2, wherein the two said distances (S,R) are determined for at least one workpiece (10) in a series, and are then assumed to be the same for all workpieces (10) of said series.

4. The method according to claim 2, wherein the two distances (S,R) are determined individually for each workpiece (10).

* * * * *

UNITED STATES PATENT AND TRADEMARK OFFICE
CERTIFICATE OF CORRECTION

PATENT NO. : 4,928,437

DATED : May 29, 1990

INVENTOR(S) : Werner Waelti

It is certified that error appears in the above-identified patent and that said Letters Patent is hereby corrected as shown below:

Claim 1, line 19, after the first occurrence of "said axis", insert --C--.

Signed and Sealed this

Twelfth Day of November, 1991

Attest:

HARRY F. MANBECK, JR.

*Attesting Officer*  *Commissioner of Patents and Trademarks*